Aug. 22, 1967 JEAN-PIERRE BIET 3,337,750

GATE-CONTROLLED TURN-ON AND TURN-OFF SYMMETRICAL SEMI-CONDUCTOR SWITCH HAVING SINGLE CONTROL GATE ELECTRODE

Filed May 14, 1964

3 Sheets-Sheet 1

INVENTOR
JEAN-PIERRE BIET
BY Paul M. Craig, Jr.
ATTORNEY

INVENTOR
JEAN-PIERRE BIET
BY Paul M. Craig, Jr.
ATTORNEY

INVENTOR
JEAN-PIERRE BIET
BY Paul M. Craig, Jr.
ATTORNEY

United States Patent Office 3,337,750

Patented Aug. 22, 1967

3,337,750

GATE-CONTROLLED TURN-ON AND TURN-OFF SYMMETRICAL SEMI-CONDUCTOR SWITCH HAVING SINGLE CONTROL GATE ELECTRODE

Jean-Pierre Biet, Saulx-les-Chartreux, France, assignor to Compagnie Generale d'Electricite, Paris, France, a corporation of France Filed May 14, 1964, Ser. No. 367,470
Claims priority, application France, May 14, 1963, 934,797; Nov. 29, 1963, 955,545
9 Claims. (Cl. 307—88.5)

This invention relates to a new and improved gate-controlled turn-on and turn-off symmetrical semi-conductor switch which employs only a single control gate element to achieve both the turn-on (unblocking) and the turn-off (blocking) functions.

Specifically, the invention relates generally to an improved semiconductor device for blocking and unblocking a circuit, of the above described type and comprising at least four junctions, each being between two semiconductor layers of opposite conduction type. More particularly the invention relates to an improved semiconductor component similar to that described in the applicant's French Patent No. 1,316,226 filed on Feb. 26, 1962, and corresponding to U.S. application Ser. No. 178,351, filed Aug. 3, 1962. The known component described in the above copending application comprises a highly doped outer p layer called $P_{t1}$, an inner n layer called $N_1$, a high resistivity p layer called $\pi$, a second inner n layer called $N_2$ and similar to $N_1$, a second highly doped + outer p layer called $P_{t2}$ and similar to $P_{t1}$, the junctions $P_{t1}$–$N_1$ on one hand and $P_{t2}$–$N_2$ on the other hand being of the "monotunnel" injecting type. Because of its symmetrical arrangement, this component may be unblocked for both transmission directions, that is to say it can let a current flow in either direction between its supply terminals, through the action of a negative polarity control pulse applied to either one of two control gate elements or connections, the direction of conduction through the component being determined by the polarity of the supply potential across said supply terminals. The component therefore comprises four connections two of which connect the outer layers $P_{t1}$ and $P_{t2}$ to the supply voltage and the other two connect the inner layers $N_1$ and $N_2$ to the control circuits. Because of the very constitution of this known component, the latter two control connections are necessarily brought to different potentials and they may not be galvanically connected. While the use of this component offers obvious advantages, it does require rather complex gating circuitry arrangements.

In comparison with the above-mentioned component, noticeably improved ease in the design of the gating circuit arrangement is obtained by applying the turn-off (blocking) turn-on (unblocking) control signals of appropriate polarity between one of the connections to the supply voltage and another single gating control electrode connection making an ohmic contact with the $\pi$ region.

A particular feature of the arrangement according to the invention therefor is that a single control electrode is connected to the middle layer of a symmetrically conducting semiconductor device, and provides both turn-on and turn-off control of conduction through the device.

In constructing one specific embodiment of the invention, this single gate control connection is achieved through an ohmic contact formed from an additional semiconductor layer of the same type as that of the middle layer, this additional semiconductor layer being made up of two successive regions, the first region being of medium doping and in contact with the middle layer, and the other region being of stronger doping than the first region and in contact with a non-rectifying terminal electrode. Preferably the ohmic contact thus comprised for linking the middle semiconductor layer to the control signal source is located in the peripheral edge of the component, and the connection with the middle layer is achieved by electrical continuity along the whole edge of said component.

The invention also makes available a manufacturing process for the above-mentioned semiconductor device wherein one starts with a pellet-shaped element of given dimensions made of a high resistivity semiconductor layer on both faces of which has been obtained by diffusion a layer of opposite conduction type. This layer is uniformly covered on its edge and its two faces with a semiconductor layer of same conduction type as the middle layer and two hollows are thereafter provided on the external faces thus provided. A last local semiconductor layer of same conduction type as the middle layer is then provided by vacuum evaporation through a mask followed by alloying, this being achieved in the bottom of the hollows and on the peripheric area of one of the faces of the component with terminal electrodes being connected to these evaporated layers. Grooves are then formed at appropriate locations which allow the junctions to be isolated in the proper manner.

According to another feature of the process according to the invention, the basic element is obtained from a homogeneous disc of large lateral dimensions made of the material of the middle semiconductor layer which is diffusion covered on both its faces with a semiconductor layer of opposite type, pellets of required dimensions being cut out of this disc.

This invention also relates to a blocking-unblocking control circuit employing a component according to our present invention, such a circuit being particularly remarkable for the fact that the signal is applied to the control electrode of the component by means of a single signal source connected to the control electrode and to either one of the two power supply connections for the component depending upon their polarity via transistors arranged back to back. This signal source preferably comprises the secondary winding of a gating transformer, the primary winding of which is supplied with the driving pulses of either positive or negative polarity which determine whether the component is turned on (unblocked) or turned off (blocked).

This invention will now be described in detail with reference to the accompanying drawings.

Figure 1:
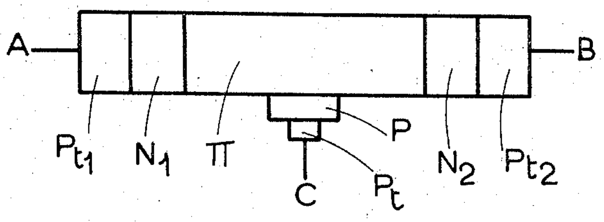
FIGURE 1 is a schematic diagram of the arrangement of the various layers making up the new and improved semi-conductor component according to the invention.

On FIGURE 1 has been shown schematically a semiconductor component according to the invention, connected between the supply connections A and B. This component is comprised by the regions $P_{t1}$, $N_1$, $\pi$, $N_2$, $P_{t2}$, and has on the $\pi$ region an ohmic contact made up by the layers P and $P_t$ located between connection C and said $\pi$ region.

Figure 2:
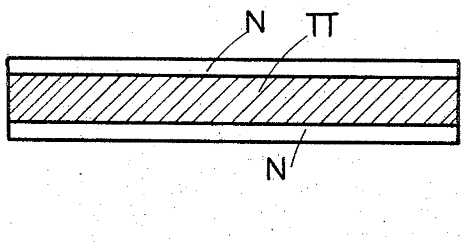
FIGURES 2, 3, 4 and 5 are sectional views of various steps of one method of manufacture of the component shown in FIGURE 1.

As an illustrative example which should not be interpreted in a limiting sense, the manufacturing process of the component shown diagrammatically on FIGURE 1 may be broken down as follows:

One starts with a high resistivity p type silicon disc-like element (hereinafter called $\pi$ for convenience of illustration in the following description). A phosphorous diffusion creates an N layer on the whole surface of the disc to produce about $10^{19}$ impurities per cm.$^3$ in the n layer, and which is then cut into smaller pellets having the dimensions of the final product (FIGURE 2). This cutting also serves the purpose of suppressing the electrical continuity between the N layers on the two faces of the pellet.

Figure 3:
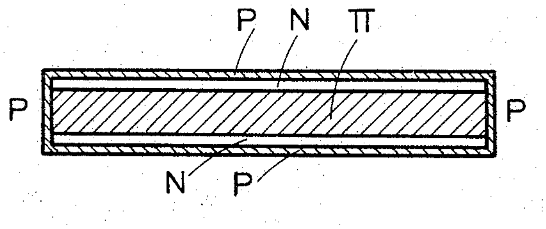

One thereafter performs a boron diffusion involving the whole pellet surface (including the lateral surface). This diffusion must be of a sufficiently high concentration so as to reverse the conductivity type at the surface, hence giving a layer called P. The duration of the boron diffusion, however, must be sufficiently short so as not to affect the N–$\pi$ junctions previously obtained during the phosphorous diffusion (FIGURE 3). The boron diffusion should be carried out for a period sufficient to form a superficial P layer containing substantially $5\times10^{19}$ impurities per cm.$^3$. This can be achieved by conducting the boron diffusion with great caution to provide the desired impurity content. Alternatively, the boron diffusion can be conducted more coarsely, and followed by a chemical attack to adjust the surface concentration to the desired value of $5\times10^{19}$ impurities per cm.$^3$.

After the required P type surface concentration has been obtained by boron diffusion, a chemical attack is then carried out on the two faces of the pellet, the depth of attack being governed on each side by the attainment of the desired surface concentration in N type impurities as necessary for the obtention of an injecting contact having the properties described in French Patent No. 1,316,226.

Figure 4:
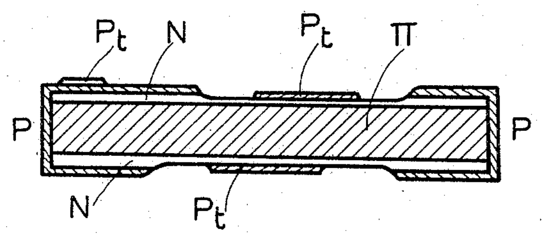

One thereafter performs a simultaneous vacuum evaporation of boron and aluminium through a mask in such a way that the corresponding deposit occurs on one hand in the bottom of the hollows obtained by chemical attack and, on the other hand, in an area of the pellet where the p layer obtained by boron diffusion is still intact and insures electrical continuity with the lateral P layer of the pellet. This alloying operation then provides the injecting junctions ($P_t$–N) and of the ohmic contact $P_t$–P (FIGURE 4). As a consequence of this operation, the ohmic contact will have a first region P of medium doping having about $5\times10^{19}$ impurities per cm.$^3$ which covers substantially the entire peripheral area of the central layer, and a second region $P_t$ of stronger doping than the first region and having about $10^{20}$ impurities per cm.$^3$.

A subsequent step is to perform isolating attacks intended to free the two $\pi$–N junctions by forming one or two circular grooves. The three terminal electrode contacts on the three $P_t$ layers (FIGURE 5) are then produced to complete the device.

Figure 5:
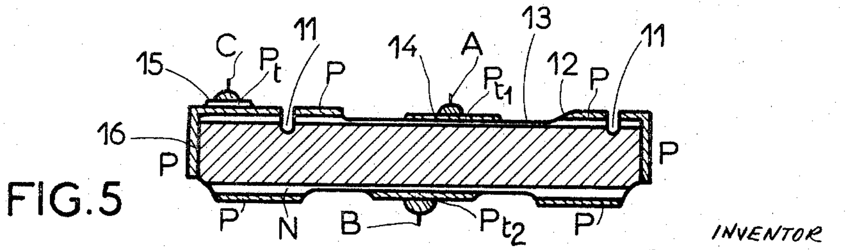
Figure 6:
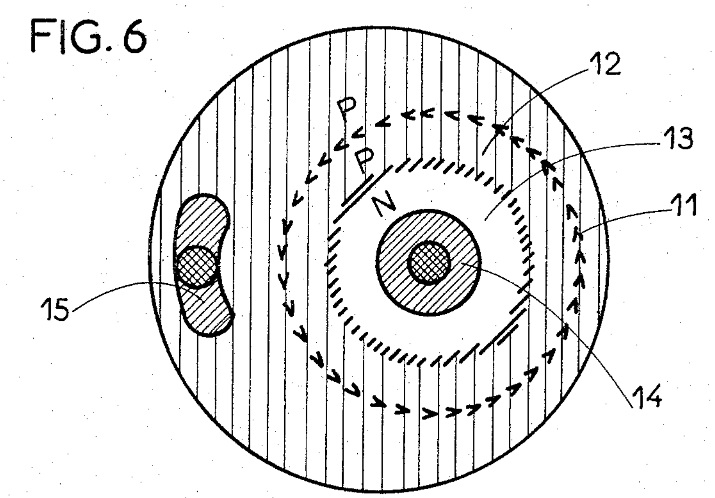
FIGURE 6 is a plan view of the completed component.

FIGURE 6 is a top view of the completed device. FIGURES 5 and 6 show the isolating grooves 11, the edge of the hollow 12, the bottom of the hollow 13, one of the two injecting contacts $P_{t1}$ or $P_{t2}$14, and the $P_t$ contact 15 on the P layer.

Figures 7, 8:
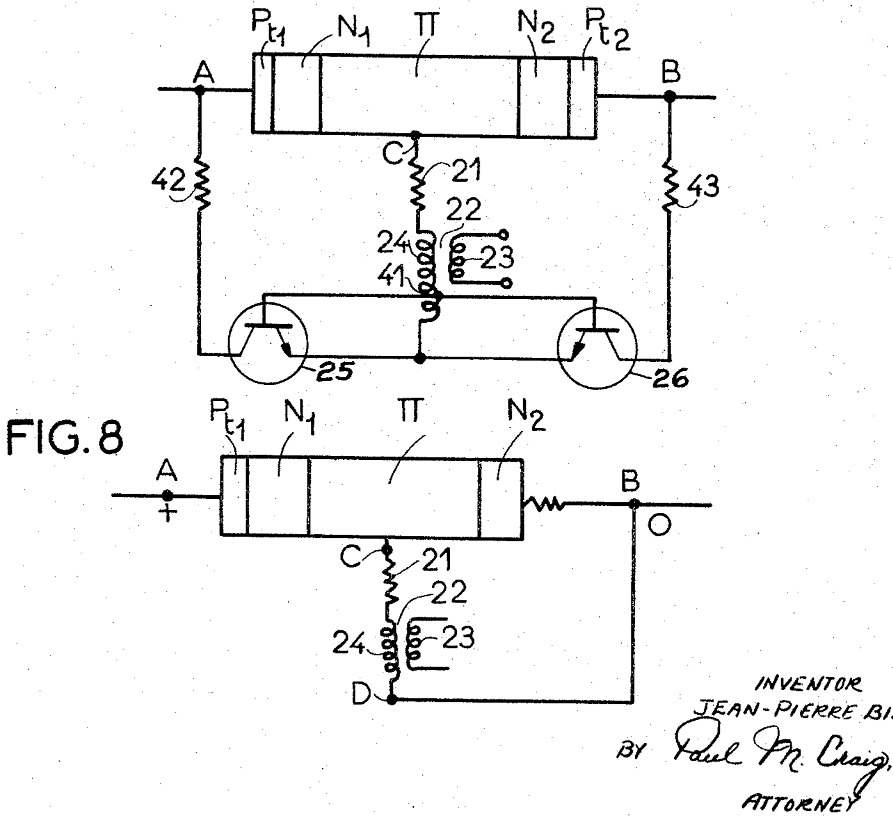
FIGURE 7 is a diagram of a suitable circuit arrangement for the application of a blocking-unblocking signal to the component according to the invention.
FIGURE 8 is an equivalent circuit diagram used to explain the operation of the diagram of FIGURE 7.

The electric circuitry for control of such a component is shown in FIGURE 7. It comprises a transformer 22 the primary winding terminals 23 of which are fed with the blocking-unblocking driving pulses of positive and negative polarity, respectively. The secondary winding 24 is connected on one hand to the component control contact C via a resistance 21 intended to limit said control current, and on the other hand between point D and connection A via transistor 25, and between point D and connection B via transformer 26. These transistors, for instance of the NPN type, should have a collector-emitter disruptive voltage higher than the component trigger voltage. The emitters of these transistors are connected to point D, their bases to a same point 41 of the driving transformer secondary winding, and their collectors respectively to each of the supply connections A and B via matching resistances 42 and 43.

Figure 9:
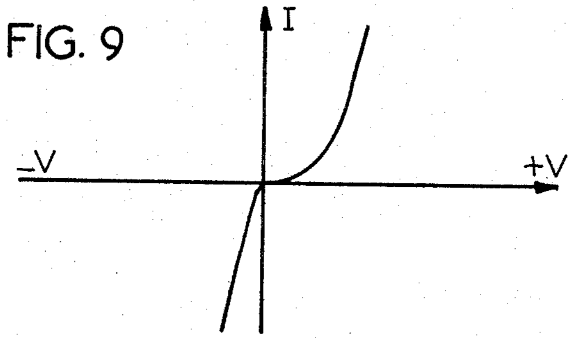
FIGURE 9 shows the operating characteristic of a "monotunnel" type diode (voltage V-current I), +V being the forward voltage and −V the reverse voltage.
Figure 10:
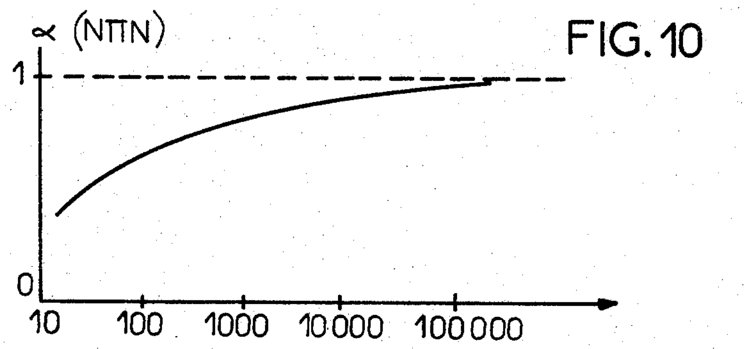
FIGURE 10 shows the variation of the current amplification for one of the two transistors $N_1\pi N_2$ or $N_2\pi N_1$ as a function of the electron current in the $\pi$ layer.
Figure 11:
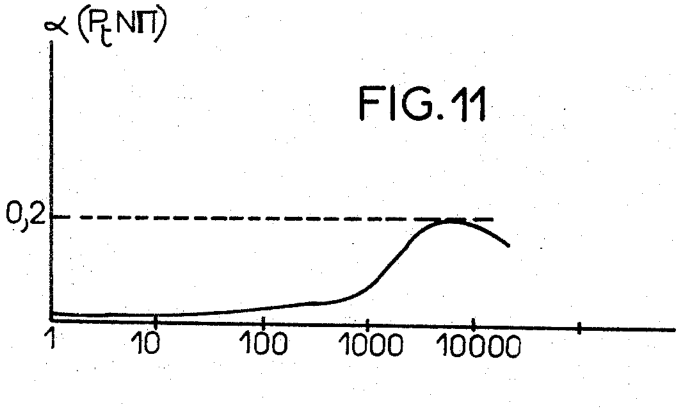
FIGURE 11 is a similar curve relevant to one of the two transistors $P_{t1}N_1\pi$ or $P_{t2}N_2\pi$.

The operation of the circuit will be described thereafter, making use on one hand of the characteristic (voltage V-current I) of a $P_tN$ junction (FIGURE 9), on the other hand of the characteristic (amplification with common base arrangement-current of minority carrier on the base) for an $N\pi N$ transistor (FIGURE 10) and for a $P_tN\pi$ transistor (FIGURE 11).

The component is first assumed to be non-biased (connections A and B at the same potential), then one assumes that point A potential is progressively raised with respect to that of point B. Under these conditions the collector junction of transistor 25 and the $N_2$–$P_{t2}$ diode are biased in the reverse direction while the collector junction of transistor 26 is biased in the forward direction; the emitter junctions of these two transistors play no part as they are in effect short-circuited. Transistor 25 is hence blocked while transistor 26 is conducting. According to FIGURE 9, one may then, in diagram 7), replace diode $N_2$–$P_{t2}$ by a small resistance, transistor 25 by an infinite resistance, and transistor 26 by a zero resistance and thus obtain FIGURE 8. The diode $N_2$–$P_{t2}$ exhibits only a small resistance in the reverse direction because it is made up by the junction between a degenerated semi-conductor layer and a non-degenerated semi-conductor where the lower level of the conduction band coincides with the Fermi level. Such a junction is termed a "mono-tunnel" diode, and it is well known that such a junction exhibits only a weak resistance in the reversely polarized direction.

At that time, the sending of a positive pulse via transformer 22 makes point C potential become positive with respect to that of point D and this pulse, reaching the bases of transistors 25 and 26, unblocks transistor 25. This lets flow a strong current while transistor 26, already biased in the forward direction, behaves like a short circuit. Transistor $N_2$–$\pi$–$N_1$ is hence unblocked and the circuit structure is triggered, this triggering occurring approximately in the same conditions as for a control electrode rectifier of the NPNP classical type. The current flows now from A to B. However, it is obvious, according to the symmetry of the device that, had the potential of point A been negative with respect to that of point B, the sending of the positive pulse on the control electrode would have caused the triggering of the structure $N_1\pi N_2P_{t2}$ and the flowing of the current from B to A.

Referring to FIGURE 8, one now assumes that the component is conducting, the current flowing from A to B. This results from the additive contributions of transistor $P_{t1}N_1\pi$ which injects a hole current towards the right, and of transistor $N_2\pi N_1$ which injects an electron current towards the left (that is a conventional current towards the right). In the conducting condition, the known triggering condition is fulfilled:

$$\alpha(P_{t1}N_1\pi)+\alpha(N_2\pi N_1)=1 \quad (1)$$

the two "$\alpha$" being respectively the current amplifications of the transistors referred to by the indices. If one now sends via transformer 22 a turn-off pulse making point C potential negative with respect to that of point D, one will block junction $\pi$–$N_2$ and decrease the injection into transistor $N_2\pi N_1$. From the shape of the curves 10 and 11, it can be appreciated that if $\alpha(N_2\pi N_1)$ falls below a value of 0.8, for instance, condition (1) would no longer be fulfilled. The component will consequently be blocked. On the other hand, at the same time that junction $\pi$–$N_2$ gets blocked, the junction $P_{t2}N_2$ will unblock. As a result transistor $P_{t2}N_2\pi$ will operate and inject into the component a current of opposite direction to that which was previously flowing in it, the phenomenon having the effect of helping the above-described blocking process.

In some cases, the circuit according to FIGURE 7 may be simplified. The transistors may be replaced by ordinary diodes connected respectively between points D and A on one hand, and between points D and B on the other hand. This is possible, particularly, if the necessary driving pulse is of sufficient brevity for the current to flow across the diodes thanks to their junction capacitance, or if the current necessary to the unblocking of the device is lower than the leakage current of each diode.

Further, it is possible for certain parts of the circuit of FIGURE 7, the five-layer component and the control circuit transistors or diodes to be built into a monolithic semiconductor block, according to the so-called integrated technique.

The examples described above are PNPNP devices, but it is understood that NPNPN devices can also be built. On the other side, the $\pi$ layer as described may also be a layer of an intrinsic semiconductor. Lastly, one might obviously use, for making such devices, any semiconductor material having the general properties required.

I claim:

1. A single gate symmetrically conducting turn-on, turn-off semi-conductor device of the triggered four layer rectifier type for the gate-controlled blocking and unblocking of a circuit including the device as the control component thereof, said device comprising at least five layers and four junctions each junction being between two semi-conductor layers of opposite conduction types, a single control electrode connected to the middle layer of the semi-conductor device, the single control electrode being comprised by an ohmic contact formed from a joining semi-conductor layer of the same type as that of said middle layer, said joining semi-conductor layer being made up of first and second regions, the first region having a first doping level stronger than that of the middle layer and extending along substantially the entire peripheral edge of the middle layer of the semi-conductor device, and the second region being of stronger doping than said first region and having terminal electrode means formed thereon to comprise the single control electrode, the connection of the second region to the first region of the joining semi-conductor layer being located on a peripheral area of the first region formed on one face of the component with the connection of the first region to the middle layer being achieved by electrical continuity along substantially the entire peripheral edge of the middle layer.

2. The semi-conductor device set forth in claim 1, wherein the first region of the joining layer contains about $5\times10^{19}$ impurities per $cm.^3$ and the second region contains about $10^{20}$ impurities per $cm.^3$.

3. The semi-conductor device set forth in claim 1, further characterized in that it is included in an electric circuit as the control component thereof together with means for applying an electric potential to be controlled across all four junctions of the device, said last-mentioned means comprising load terminal electrode means, a turn-on, turn-off gating transformer having inductively coupled primary and secondary windings and having a reversible polarity source of impulse gating signals coupled to the primary winding, the single control electrode of said semi-conductor device being connected to one of the extremities of the secondary winding of the gating transformer, transistor means comprised by a pair of gating transistors each having their collector electrodes connected to respective load terminal electrodes of the semi-conductor device, the other extremity of the secondary winding of the gating transformer being connected to the load terminal electrodes through the intermediary of the pair of gating transistors which have a common emitter connection to said other extremity of the secondary winding, the bases of the pair of gating transistors being connected to the same point on the secondary winding situated between the two extremities thereof.

4. A single gate, symmetrically conducting, turn-on, turn-off semi-conductor device of the triggered four layer rectifier type, especially intended for gate-controlled blocking and unblocking of the circuit in which it is inserted, said device comprising four junctions each between two semi-conductor layers of opposite conduction type, one of the layers, called the central layer, being formed by a disc-like element of semi-conductor, high resistivity material, two other layers, called intermediate layers, of semi-conductor material of the conduction type opposed to that of the central layer being respectively disposed on the surface of each of the two faces of the said central layer, two other layers called terminal layers, of semi-conductor material of the conduction type opposed to that of the material constituting the said intermediate layers, being disposed each respectively on one part of the surface of the two intermediate layers, the said terminal layers each carrying an electrode called a terminal electrode for connection with the said circuit, the number of impurities respectively contained in each of the terminal layers and in each of the intermediate layers being such that the respective junction between one terminal layer and one intermediate layer is of the "mono-tunnel" type, the device possessing another layer, called a joining layer of semi-conductor material of the same type of conduction as the central layer, comprising a first region having a first doping level and extending along substantially the entire peripheral edge of the central layer, said joining layer further comprising a second region of stronger doping than said first region, the said second region being connected to a terminal electrode means to form a single control electrode for the semi-conductor device, the connection of the second region to the first region of the joining semiconductor layer being located on a peripheral area of the first region formed on one face of the component, and at least one circular groove encircling one of the terminal layers and cut almost entirely in the first region of said joining layer to electrically isolate said peripheral area and having such a depth that it reaches the central layer.

5. The semi-conductor device set forth in claim 4, wherein the first region of the joining layer contains about $5\times10^{19}$ impurities per $cm.^3$ and the second region contains about $10^{20}$ impurities per $cm.^3$.

6. A base circuit comprising the semi-conductor device described in claim 14 inserted in a circuit to be blocked or unblocked by the intermediary of the terminal electrodes, a turn-on, turn-off gating transformer having inductively coupled primary and secondary windings and having a reversible polarity source of impulse gating signals coupled to the primary winding, the single control electrode of said semi-conductor device being connected to one of the extremities of the secondary winding of the gating transformer, transsitor means comprised by a pair of gating transistors each having their collector electrodes connected to respective terminal electrodes of the semi-conductor device, the other extremity of the secondary winding of the gating transformer being connected to the terminal electrodes through the intermediary of the pair of gating transistors which have a common emitter connection to said other extremity of the secondary winding, the bases of the pair of gating transistors being connected to the same point on the secondary winding situated between the two extremities thereof.

7. A single gate, symmetrically conducting, turn-on, turn-off semi-conductor device of the triggered four layer rectifier type, especially intended for gate-controlled blocking and unblocking of the circuit in which it is inserted, said device comprising four junctions each between two semi-conductor layers of opposite conduction type, one of the layers, called the central layer, being formed by a disc-like element of semi-conductor, high resistivity material, two other layers, called intermediate layers, of semiconductor material of the conduction type opposed to that of the central layer being respectively disposed on the surface of each of the two faces of said central layer, two other layers called terminal layers, of semi-conductor material of the conduction type opposed to that of the material constituting the said intermediate layers, being disposed each respectively on one part of the surface of the two intermediate layers, the said terminal layers each carrying an electrode called a terminal electrode for connection with the said circuit, the number of impurities respectively contained in each of the terminal layers and in each of the intermediate layers being such that the respective junction between one terminal layer and one intermediate layer is of the "mono-tunnel" type, the device possessing another layer, called a joining layer of semi-conductor material of the same type of conduction as the central layer, comprising a first region having a first doping level containing about $5\times10^{19}$ impurities per $cm.^3$ and extending along substantially the entire peripheral edge of the central layer, said joining layer further comprising a second region of stronger doping than said first region and containing about $10^{20}$ impurities per $cm.^3$ and placed in contact with a portion of the first region that is located on a peripheral area of the first region formed on one fact of the semi-conductor device, the said second region being connected to a terminal electrode to form a single control electrode for the semi-conductor device, and at least one circular groove encircling one of the terminal layers and cut almost entirely in the first region of said joining layer to electrically isolate said peripheral area and having such a depth that it reaches the central layer.

8. The semi-conductor device set forth in claim 7, further comprised by a chamfering along the peripheral edge of the opposite side from the control electrode in such a way that the joining layer is cut between the central layer and the corresponding intermediate layer.

9. The semi-conductor device set forth in claim 8, further characterized in that the device is inserted in a circuit to be blocked or unblocked by the intermediary of the terminal electrodes, a turn-on, turn-off gating transformer having inductively coupled primary and secondary windings and have a reversible polarity source of impulse gating signals coupled to the primary winding, the single control electrode of said semi-conductor device being connected to one of the extremities of the secondary winding of the gating transformer, transistor means comprised by a pair of gating transistors each having their collector electrodes connected to respective terminal electrodes of the semi-conductor device, the other extremity of the secondary winding of the gating transformer being connected to the terminal electrodes through the intermediary of the pair of gating transistors which have a common emitter connection to said other extremity of the secondary winding, the bases of the pair of gating transistors being connected to the same point on the secondary winding situated between the two extremities thereof.

References Cited

UNITED STATES PATENTS

| | | | |
|---|---|---|---|
| 2,502,479 | 4/1950 | Pearson et al. | 148—33.5 |
| 2,792,540 | 5/1959 | Pfann | 317—235 |
| 2,891,171 | 6/1959 | Shockley | 317—235 |
| 2,928,036 | 3/1960 | Walker | 317—235 |
| 2,966,434 | 12/1960 | Hibberd | 317—235 |
| 3,126,505 | 3/1964 | Shockley | 317—235 |
| 3,140,963 | 7/1964 | Svedberg | 148—33.5 |
| 3,146,135 | 8/1964 | Sah | 317—235 |
| 3,217,378 | 11/1965 | Reuschel et al. | 317—235 |
| 3,218,525 | 11/1965 | More et al. | 317—235 |
| 3,223,560 | 12/1965 | Millington | 317—235 |
| 3,260,901 | 7/1966 | Luescher et al. | 317—235 |

FOREIGN PATENTS

| | | |
|---|---|---|
| 657,345 | 2/1963 | Canada. |
| 910,050 | 11/1962 | Great Britain. |

OTHER REFERENCES

Electronics, "Silicon Rectifier Controls Power in Either Direction," by Luscher et al., Dec. 20, 1963, pp. 63–65.

JOHN W. HUCKERT, *Primary Examiner.*

J. D. CRAIG, *Assistant Examiner.*